(12) United States Patent
Wilson

(10) Patent No.: US 6,558,605 B1
(45) Date of Patent: May 6, 2003

(54) METHOD OF MOLDING LARGE THIN PARTS FROM REINFORCED PLASTIC MATERIAL

(75) Inventor: Phillip S. Wilson, Commerce Township, MI (US)

(73) Assignee: Magna International of America, Inc., Troy, MI (US)

( * ) Notice: Subject to any disclaimer, the term of this patent is extended or adjusted under 35 U.S.C. 154(b) by 0 days.

(21) Appl. No.: 09/762,647
(22) PCT Filed: Aug. 11, 1999
(86) PCT No.: PCT/US99/18157

§ 371 (c)(1),
(2), (4) Date: Mar. 27, 2001

(87) PCT Pub. No.: WO00/09310
PCT Pub. Date: Feb. 24, 2000

Related U.S. Application Data

(60) Provisional application No. 60/096,158, filed on Aug. 11, 1998.

(51) Int. Cl.[7] .............................. B29C 45/18; C08K 3/34
(52) U.S. Cl. .............................. 264/328.8; 264/328.13; 264/328.18
(58) Field of Search .......................... 264/328.1, 328.8, 264/328.9, 328.12, 328.13, 328.18

(56) References Cited

U.S. PATENT DOCUMENTS

| 4,244,910 A | 1/1981 | Yui et al. |
| 4,739,007 A | 4/1988 | Okada et al. |
| 5,423,673 A | 6/1995 | Sawae et al. |
| 5,556,582 A | 9/1996 | Kazmer |
| 5,747,560 A | 5/1998 | Christiani et al. |
| 5,762,855 A | 6/1998 | Betters et al. |

FOREIGN PATENT DOCUMENTS

| WO | WO 00/09310 | 2/2000 |

Primary Examiner—Jill L. Heitbrink
(74) Attorney, Agent, or Firm—Pillsbury Winthrop LLP

(57) ABSTRACT

Reinforced plastic pellets comprise thermoplastic material and reinforcement particles that are less than 15% of a total volume of the pellets, and at least 40% have a thickness of less than 50 nanometers. A manifold (56) has at least two spaced valve gates (64) that are independently opened and closed as directed by a controller (68) to selectively communicate the manifold to a cavity. A primary injection pressure is applied to the plasticized pellet material in the manifold (56) to fill the cavity through sequential opening and closing of the gates (64). A lower secondary injection pressure is applied to the material in the manifold to continue filling the cavity. The gates are closed to seal the manifold from the cavity when the cavity is filled. The material is held within the manifold in compression by the valves while the cavity is open to prevent expansion of the material.

26 Claims, 8 Drawing Sheets

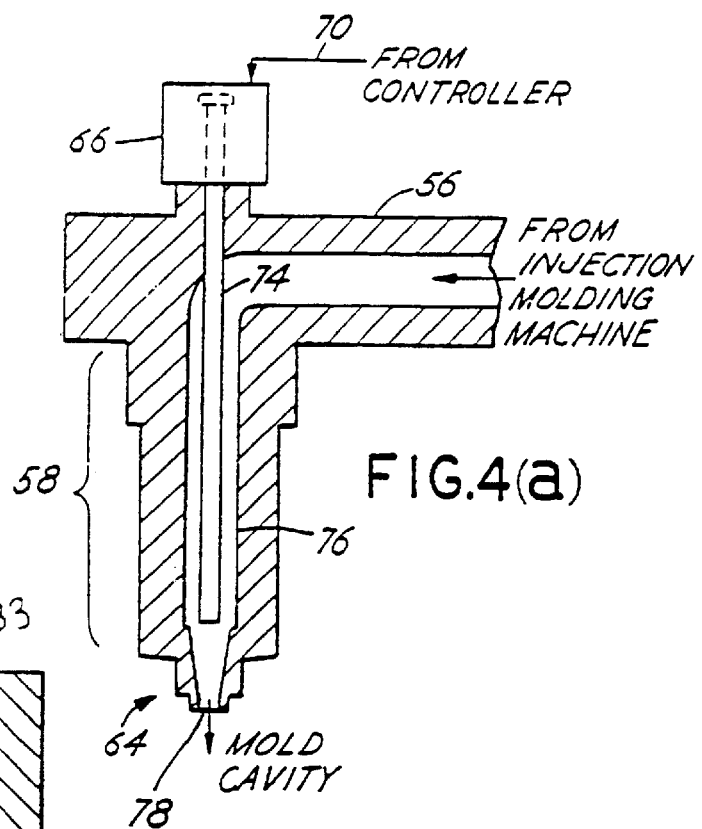
FIG.4(a)
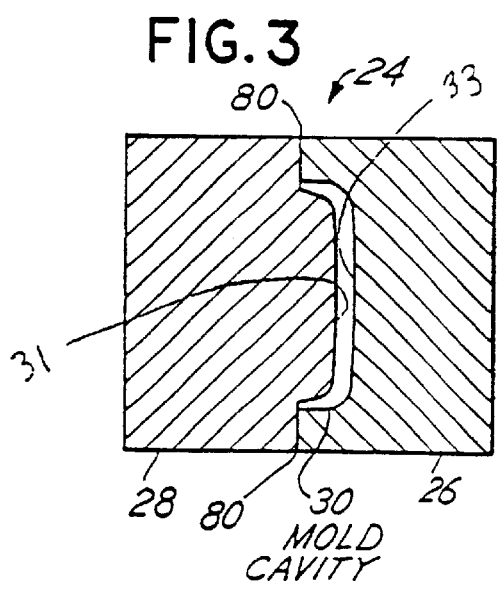
FIG.3
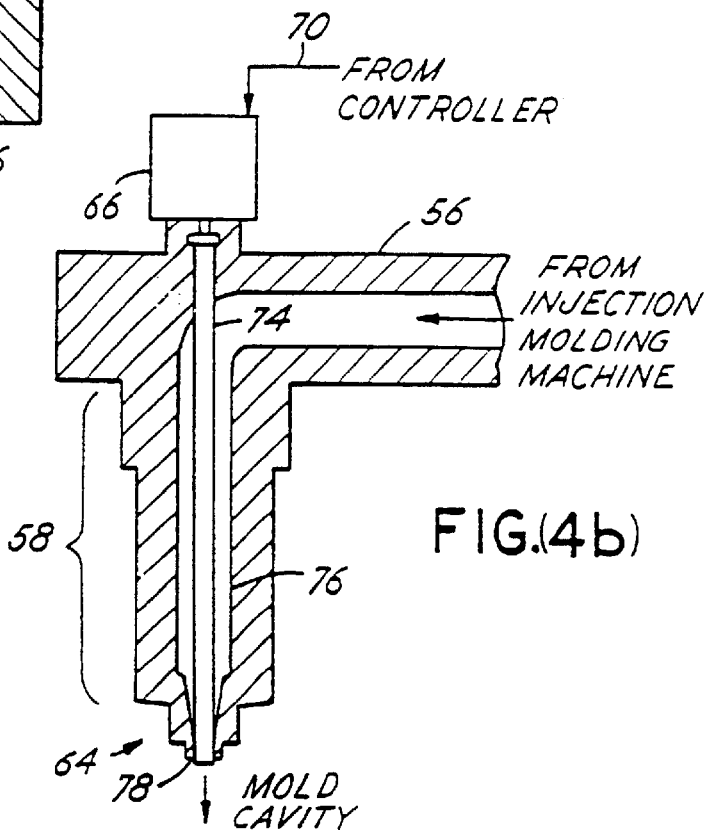
FIG.(4b)

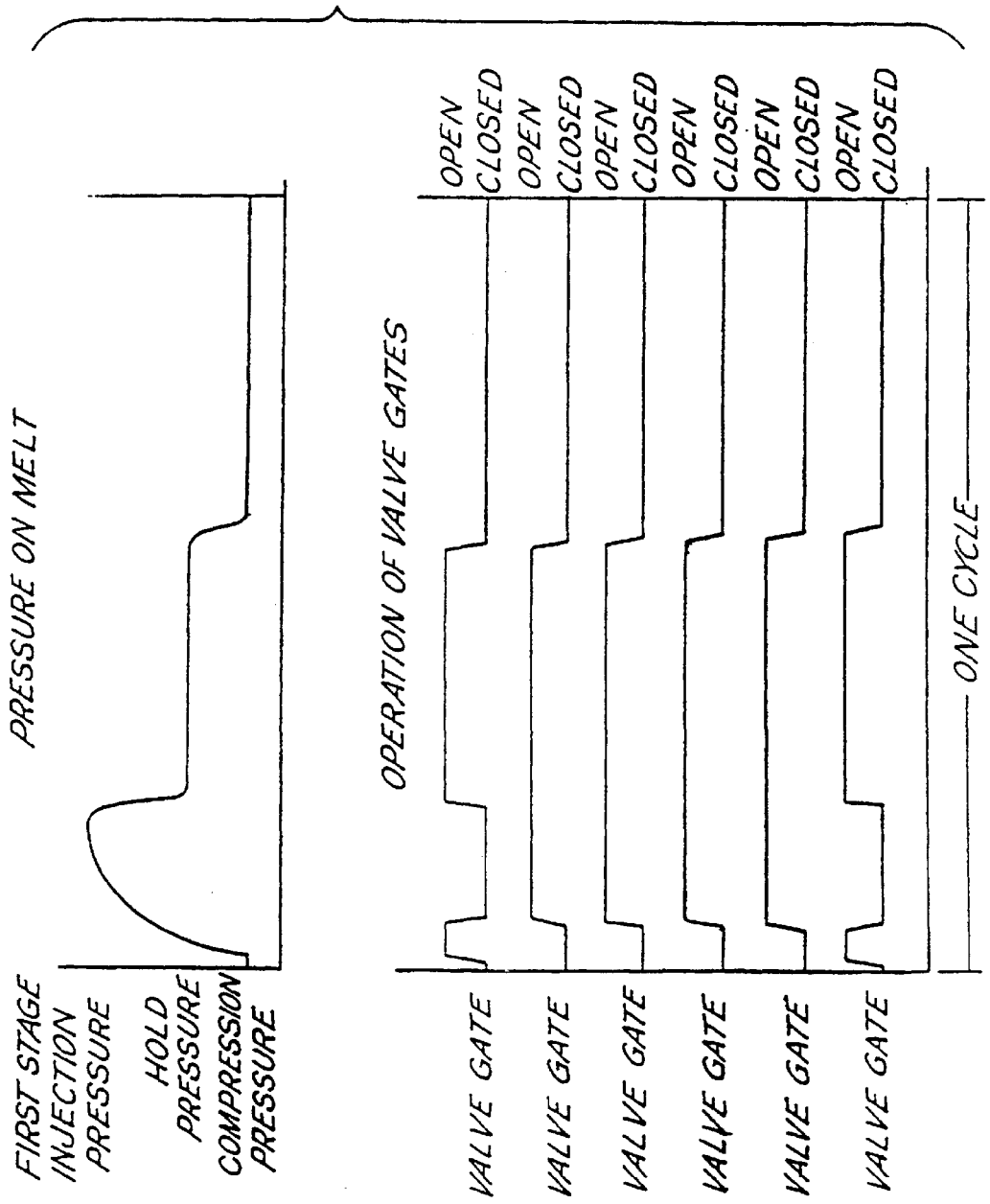

METHOD OF MOLDING LARGE THIN PARTS FROM REINFORCED PLASTIC MATERIAL

This application is based on and claims the priority benefit of U.S. provisional patent application Serial No. 60/096,158, which was filed on Aug. 11, 1998.

FIELD OF THE INVENTION

The present invention relates to injection molding methods and apparatus, and, more particularly, a sequential fill valve gated injection molding system for molding reinforced thermoplastics particularly suited for producing large, thin molded components.

BACKGROUND OF THE INVENTION

Recently, there has been an increase in the demand and applications for large molded plastic parts. As a result, some of these parts have become quite complex. One example of this can be seen in bumper fascia for automobiles. Design engineers are now integrating many features into the fascia such as grilles and light openings to reduce tooling and manufacturing costs. Also, to save material, fascia are designed with thinner walls. Due to the complex cavity geometries and increased flow length versus wall thickness ratios, it is often difficult to predict the actual flow pattern that will take place during mold filling. Although design software may be used to help determine the most optimum processing conditions, gate locations, and hot runner diameters for a balanced fill, quite often the expected fill pattern is not realized in practice as a result of variables such as steel dimension variations, mold temperature variations, and venting inadequacies, for example. Process engineers are therefore faced with a nonuniform fill which under certain conditions may result in decreased dimensional stability of the fascia, as well as deficiencies in paint adhesion characteristics and/or other surface appearance concerns.

Improved processing techniques that provide more control over the filling of large complex cavity geometries are required to meet the increased demands presented by more modern molding standards. To improve part quality, melt front advancement must be further controlled during the actual filling phase to achieve a more uniform filling and packing distribution. In addition, there is a continuing interest in pursuing further time and cost efficiencies associated with part manufacture.

U.S. Pat. No. 5,762,855 discloses an injection molding system for large molded components that may be used to enhance the quality of the final molded part in a timely and cost-efficient manner. Specifically, that patent discloses a method for molding large components in a mold having at least one mold cavity. Plasticized material is introduced into a cavity mold through a manifold. The manifold has at least two spaced valve gates that are independently opened and closed as directed by a controller to selectively communicate plasticized material from the manifold to the mold cavity at separate locations in the mold cavity. The controller directs the valve gates to sequentially open and close during the filling phase so as to achieve the desired melt front advancement within the mold cavity. Once the mold cavity has been filled, the valve gates are closed to effectively seal the manifold from the mold cavity. The closed valve gates thereby assist in allowing the plasticized material within the manifold to be held in compression while the mold cavity is open for removal of the molded component from the mold cavity, so as to prevent appreciable expansion of the material that has been found to result in imperfections, such as splay, in molded products.

While the invention disclosed in the '855 patent is particularly useful for producing large, thin walled plastic parts, its usefulness is limited by the structural characteristics of the plastic material conventionally used. That is, while the invention disclosed is particularly suited for parts with large planar dimensions and thin walls, the usefulness of the disclosed invention is limited by the fact that the parts produced can be only so large or so thin before the parts lose their structural integrity and impact resistance.

Heretofore, in order to reinforce various thin plastic parts such as fascia, such parts would conventionally be reinforced by mineral fillers or glass fibers. However, such reinforcement has a deteriorating effect on impact resistance of the part. Moreover, the conventional reinforcement materials are inadequate to enable the full benefits that might otherwise be achieved by the methodology disclosed by the '855 patent.

SUMMARY OF THE INVENTION

The disadvantages of the prior art may be overcome by providing a method for molding large, thin components in a mold having at least one mold cavity. Reinforced plastic pellets are provided, which pellets comprise at least one thermoplastic material and reinforcement particles dispersed within the at least one thermoplastic material, the reinforcement particles comprise less than 15% of a total volume of the pellets, and at least 40% of the reinforcement particles have a thickness of less than about 50 nanometers. The reinforced plastic pellets are melted to produce plasticized material therefrom. The plasticized material is communicated through a manifold to a cavity mold. The manifold has at least two spaced valve gates that are independently opened and closed as directed by a controller to selectively communicate the plasticized material from the manifold to the mold cavity at separate locations in the mold. A primary injection pressure is applied to the plasticized material in the manifold to fill the mold cavity through sequential opening and closing of the valve gates as directed by the controller. A secondary injection pressure is applied to the plasticized material in the manifold to continue to fill the mold cavity. The secondary injection pressure is less than the primary injection pressure. The valve gates are closed to seal the manifold from the mold cavity when the mold cavity is filled. The plasticized material is held within the manifold in compression while the mold cavity is open for removal of the molded component from the mold cavity. The compression is maintained with the assistance of the closed valve gates to prevent appreciable expansion of the material.

Other objects and advantages of the present invention will become apparent from the following detailed description.

BRIEF DESCRIPTION OF THE DRAWING

A preferred embodiment of the present invention is described herein with reference to the drawing wherein:

FIG. 3 is a cross-sectional side view of an example mold where a core portion and a cavity portion mate to form a mold cavity;

FIG. 4(a) is a cross-sectional side view of a preferred valve gated nozzle of the type used in accordance with one embodiment of the present invention, with the valve pin in the open position;

FIG. 4(b) is a cross-sectional side view of a preferred valve gated nozzle of the type used in accordance with one embodiment of the present invention, with the valve pin in the closed position;

FIG. 8 is a timing diagram to illustrate the relationship between the pressure applied to the melt and the operation of the valve gates in an example embodiment of the present invention.

DESCRIPTION OF THE PREFERRED EMBODIMENT

Figure 1:
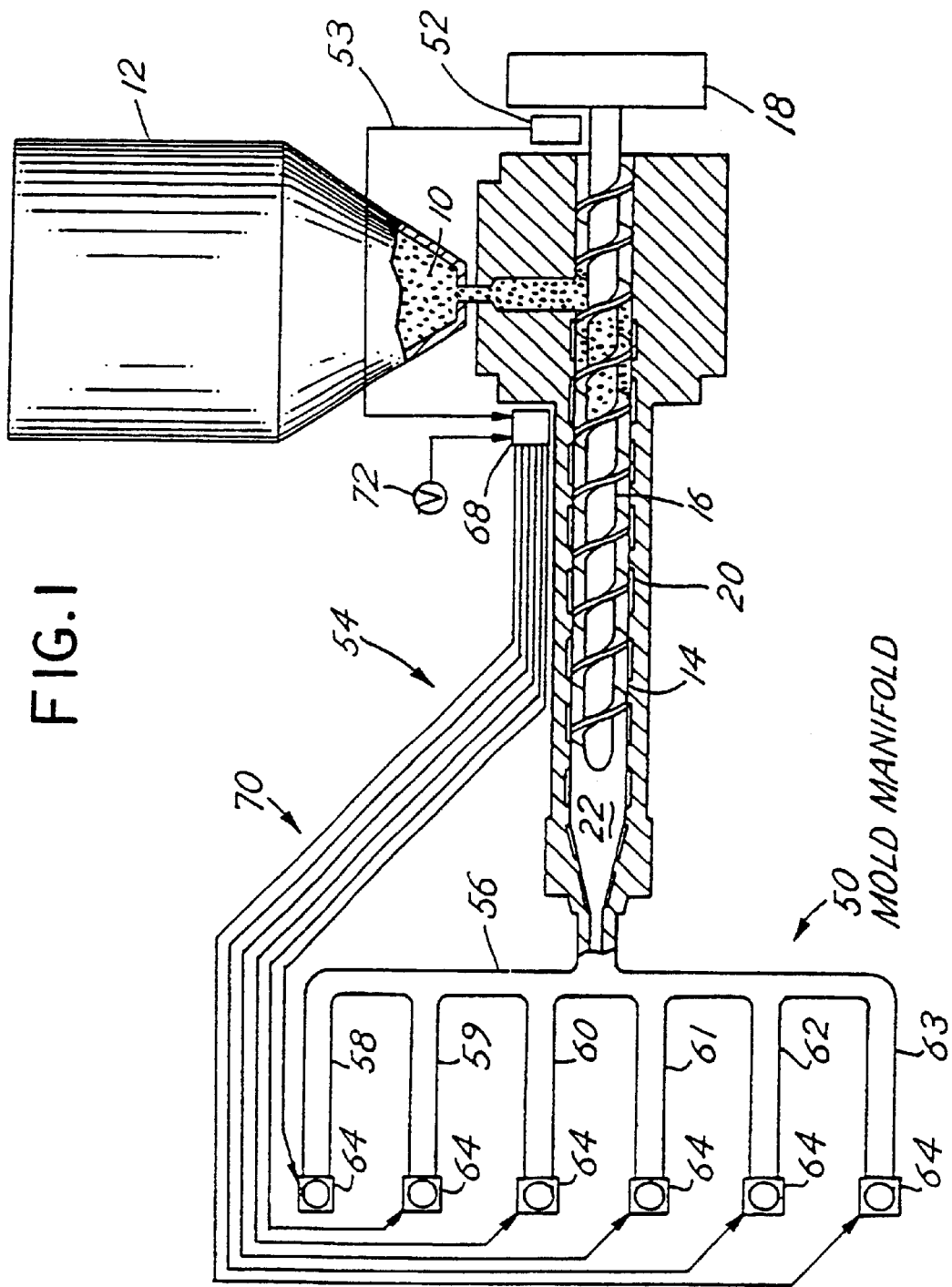
FIG. 1 is a schematic representation of a valve-gated injection molding system in accordance with one embodiment of the present invention.
Figure 2:
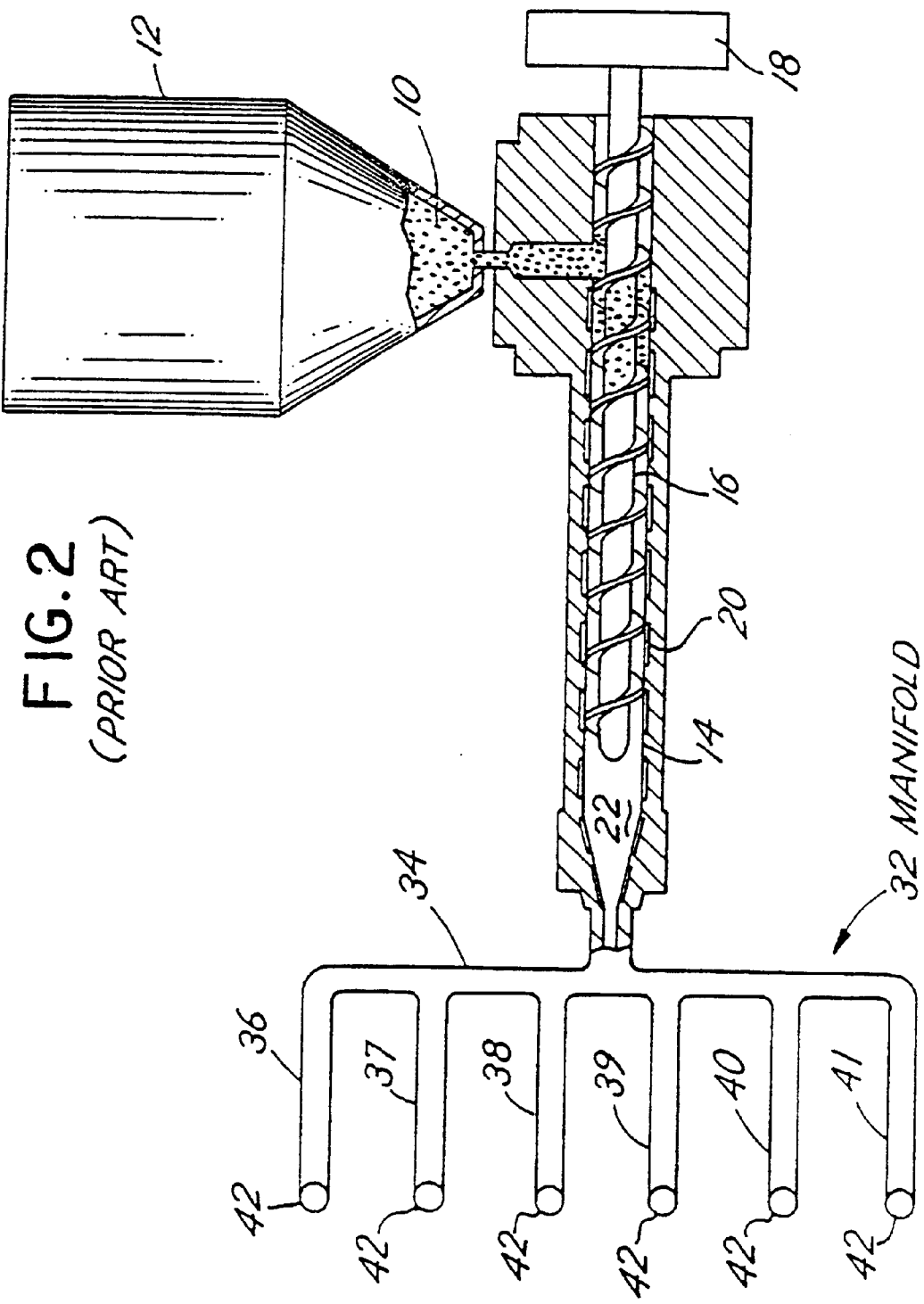
FIG. 2 is a schematic representation of a prior art injection molding machine communicating with a main bore from which multiple thermally-gated drops depend to introduce plasticized material to a mold cavity.

FIGS. 1 and 2 each illustrate an injection molding apparatus whereby nanoparticle reinforced plastic pellets 10 are fed from a hopper 12 into a cylindrical channel 14, where the pellets 10 are transported along the length of the channel 14 through the use of a reciprocating screw 16. Axial rotation of the screw 16 is achieved through a hydraulic motor 18. As the pellets 10 traverse the channel 14, they become heated by heater bands 20 and, as a result, the pellets 10 melt and coalesce to form a melt pool 22. The melt pool 22 that resides upstream from the screw 16 constitutes the shot of plasticized material in queue to be next injected through the mold manifold and into the mold cavity.

In accordance with the present invention, the pellets 10 comprise at least one thermoplastic material and reinforcement particles dispersed within the at least one thermoplastic material. The reinforcement particles comprise less than 15% of a total volume of the pellets 10, and at least 40% of the reinforcement particles have a thickness of less than about 50 nanometers.

In a more preferred embodiment, at least 50% of the reinforcement particles have a thickness of less than about 20 nanometers, at least 90% of the reinforcement particles have a thickness of less than about 10 nanometers, and at least 99% of the reinforcement particles have a thickness of less than about 30 nanometers.

The reinforcement filler particles, also referred to as "nanoparticles" due to the magnitude of their dimensions, each comprise one or more generally flat platelets. Each platelet has a thickness of between 0.7–1.2 nanometers. Generally, the average platelet thickness is approximately 1 nanometer thick. The aspect ratio (which is the largest dimension divided by the thickness) for each particle is about 50 to about 300.

The platelet particles or nanoparticles are derivable from larger layered mineral particles. Any layered mineral capable of being intercalated may be employed in the present invention. Layered silicate minerals are preferred. The layered silicate minerals that may be employed include natural and artificial minerals. Non-limiting examples of more preferred minerals include montinorillonite, vermiculite, hectorite, saponite, hydrotalcites, kanemite, sodium octosilicate, magadiite, and kenyaite. Mixed Mg and Al hydroxides may also be used. Among the most preferred minerals is montmorillonite.

To exfoliate the larger mineral particles into their constituent layers, different methods may be employed. For example, swellable layered minerals, such as montmorillonite and saponite are known to intercalate water to expand the inter layer distance of the layered mineral, thereby facilitating exfoliation and dispersion of the layers uniformly in water. Dispersion of layers in water is aided by mixing with high shear. The mineral particles may also be exfoliated by a shearing process in which the mineral particles are impregnated with water, then frozen, and then dried. The freeze dried particles are then mixed into molten polymeric material and subjected to a high sheer mixing operation so as to peel individual platelets from multiplatelet particles and thereby reduce the particle sizes to the desired range.

The pellets 10 utilized in accordance with the present invention are prepared by combining the platelet mineral with the desired polymer in the desired ratios. The components can be blended by general techniques known to those skilled in the art. For example, the components can be blended and then melted in mixers or extruders. Preferably, the pellets 10 are cut from an extruded rod of material.

Additional specific preferred methods, for the purposes of the present invention, for forming a polymer composite having dispersed therein exfoliated layered particles are disclosed in U.S. Pat. Nos. 5,717,000, 5,747,560, 5,698,624, and WO 93/11190, each of which is hereby incorporated by reference. For additional background, the following are also incorporated by reference: U.S. Pat. Nos. 4,739,007 and 5,652,284.

Preferably, the thermoplastic used for the purposes of the present invention is a polyolefin or a blend of polyolefins. The preferred polyolefin is at least one member selected from the group consisting of polypropylene, ethylene-propylene copolymers, thermoplastic olefins (TPOs), and thermoplastic polyolefin elastomers (TPEs).

The exfoliation of layered mineral particles into constituent layers need not be complete in order to achieve the objects of the present invention. The present invention contemplates that at least 40% of the particles should be less than about 50 nanometers in thickness and, thus, at least 40% of the particles should be less than about 50 platelets stacked upon one another in the thickness direction. At this extent of exfoliation, with a loading of less than 15% by volume, the benefits of the nanoparticles begin to accrue with meaningful effect for many large thin part applications. For example, such loading of nanoparticles will provide a desired increase in the modulus of elasticity by about 50–70% over conventional fillers.

More preferably, at least 50% of the particles should have a thickness of less than 10 nanometers. At this level, an additional increase of about 50–70% in the modulus of elasticity is achieved in comparison with the 40% of less than 50 nanometer thick exfoliation discussed above. This provides a level of reinforcement and impact resistance which would be highly suitable for most motor vehicle fascia applications.

Even more preferably, at least 70% of the particles should have a thickness of less than 5 nanometers, which would achieve an additional 50–70% increase in the modulus of elasticity in comparison with the 50% of less than 10 nanometer thickness exfoliation discussed above. This provides ideal reinforcement and impact resistance for large thin parts that must withstand greater degrees of impart.

Even more preferably, at least 50% of the reinforcement particles have a thickness of less than about 20 nanometers, with at least 90% of the reinforcement particles having a thickness of less than about 10 nanometers, and at least 99% of the reinforcement particles having a thickness of less than about 30 nanometers.

It is most preferable to have as many particles as possible to be as small as possible, ideally including only a single platelet.

As noted above, the preferred aspect ratio (which is the largest dimension divided by the thickness) for each particle is about 50 to about 300. At least 80% of the particles should be within this range. If too many particles have an aspect ratio above 300, the material becomes too viscous for forming parts in an effective and efficient manner. If too many particles have an aspect ratio of smaller than 50, the particle reinforcements will not provide the desired reinforcement characteristics. More preferably, the aspect ratio for each particle is between 100–200. Most preferably, at least 90% of the particles have an aspect ratio within the 100–200 range.

Generally, in accordance with the present invention, the pellets 10 and hence the parts to be manufactured should contain less than 15% by volume of the reinforcement particles of the type contemplated herein. The balance of the part is to comprise an appropriate thermoplastic (preferably polyolefin) material and suitable additives. If greater than 15% by volume of reinforcement filler is used, the viscosity of the composition becomes too high and thus difficult to mold.

Returning to the figures, the preferred sequential fill valve gated injection molding system is shown in FIGS. 1 and 4–8. The press is used in the preferred embodiment to produce automobile facias, such as bumper components for example. It will be understood, however, that other types of large parts, such as those that typically weigh 4 or more pounds for example, may similarly be manufactured through the use of the present invention.

As shown for example in FIG. 3, a typical mold 24 consists of a cavity portion 26 and a core portion 28. The cavity portion 26 and core portion 28 mate with one another to form a mold cavity 30, and are held with substantial mold press forces to form an injection molded part when the mold cavity 30 is filled. The movable section of the mold, whether the cavity portion 26 or core portion 28 for example, can be opened and closed upon the stationary section to allow molded parts to be withdrawn from the mold 24.

Figure 5:
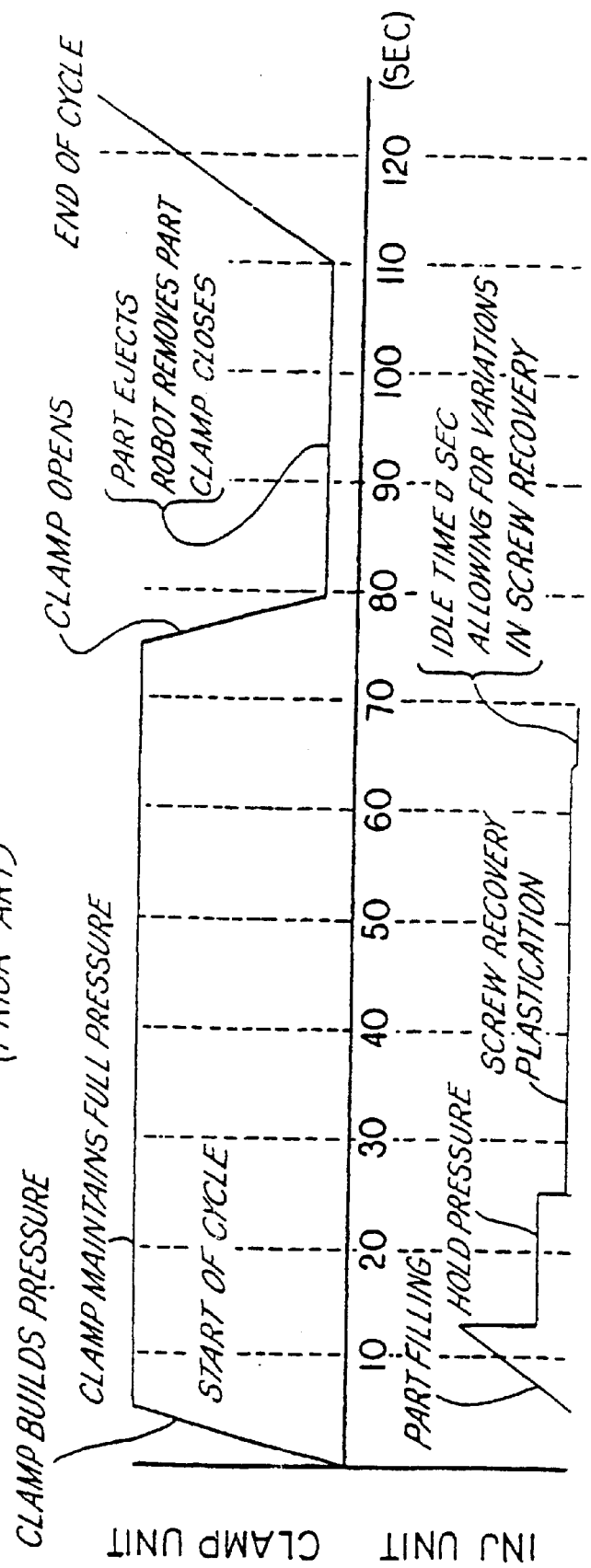
FIG. 5 is a timing diagram to illustrate the molding cycle time of an example application of a prior art injection molding system.

FIG. 5 is a diagram to illustrate a typical 100–110 second cycle used before the present invention to form an automobile facia component. With reference now to FIGS. 2 and 5, the cycle begins with the mold clamp building pressure to a full pressure that is maintained during the molding of the part. Pressure on the melt pool 22 exerted by the screw 16 creates an injection pressure that is used to fill the mold cavity 30 with the melt pool 22 in queue in the manifold 32. The first stage injection pressure exerted on the melt pool 22 by the screw 16 causes the melt pool 22 to advance through the main bore 34 of the manifold 32.

Six heated drops 36–41 depend from the main bore 34 at spaced intervals to simultaneously introduce the melt pool 22 into the molding cavity 30 at six separate locations. Although the mold cavity 30 is filled through simultaneous advancement of the melt 22 through the six drops 36–41, balancing of the fill may be sought by varying the diameters of the interior central channels of the respective drops 36–41.

Once the part has been substantially filled (e.g. 95% filled) during this first stage pressure, the injection pressure is lowered to a hold pressure whereby the mold 30 continues to fill simultaneously through all six drops 36–41 at a reduced injection pressure. Full pressure is maintained on the clamp to keep flash to a minimum.

Once the mold has been completely filled, additional material is plasticized upstream of the thermal gates 42 during a screw recovery stage to form the next shot of plasticized material in queue for the next part cycle. Once screw recovery is complete, each of the thermal gates 42 on the depending drops 36–41 draws heat away from adjacent mold steel so as to harden plasticized material at the tips of all six drops 36–41. This hardening of plasticized material at the tips of the drops 36–41 in turn seals the manifold 32 such that melt 22 is retained within the manifold 32 in anticipation of the next part cycle.

The molding cycle then reaches a decompression stage whereby the injection pressure imposed on the melt 22 is relieved substantially or even altogether through retraction of the screw 16. Decompression of the melt 22 in this way helps ensure that the thermal seals formed at the thermal gate locations 42 on the manifold 32 remain effective when the clamp is opened and the molded part is removed. It has been found, however, that decompression of the melt 22 at this stage allows gasses or other volatiles to expand in the melt 22 upstream of the thermal gates 42, which in turn often results in imperfections in subsequently-molded parts. Such imperfections may appear on the molded product as surface splay or silver streaking, for example.

Once the manifold 32 has been thermally sealed at the various gate locations 42 and the melt 22 has been decompressed, the clamp is opened and the molded part is removed. The clamp then closes in anticipation of the next part cycle.

The total time for the molding cycle described above is approximately 100–110 seconds or more for an example molded automobile bumper part.

Figure 6:
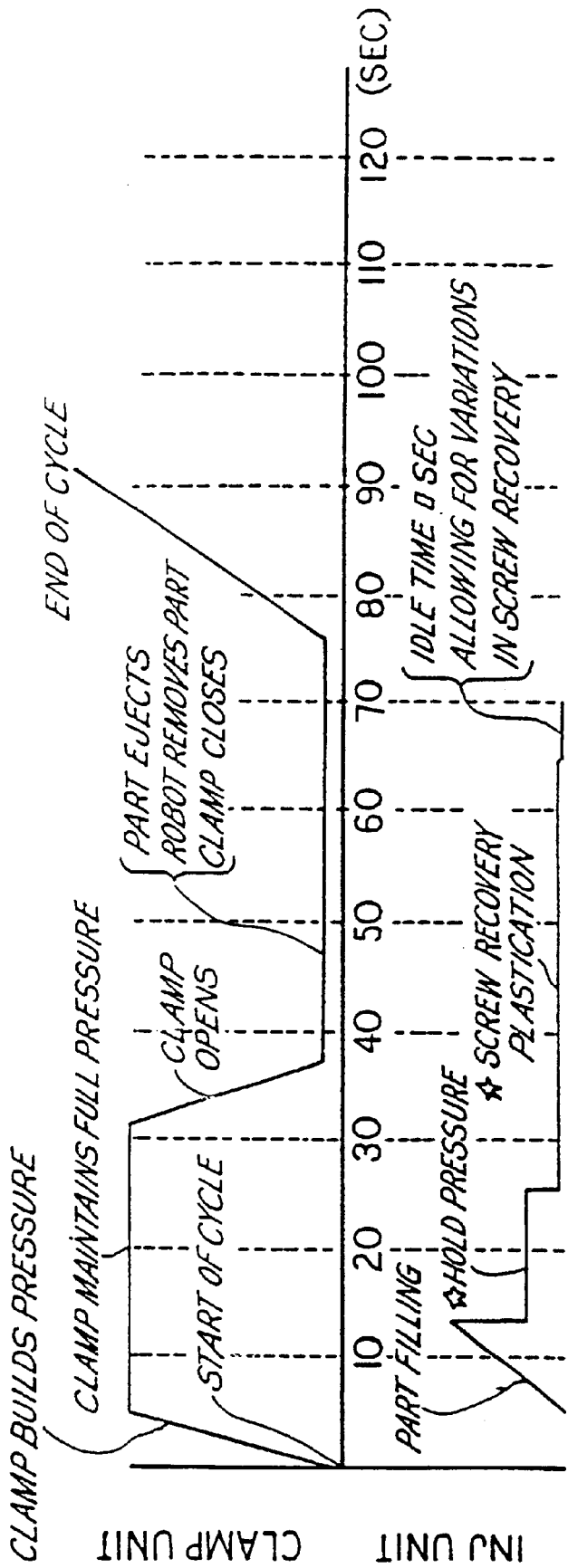
FIG. 6 is a timing diagram to illustrate the reduced molding cycle time realized in an example application of the present invention.
Figure 7A:
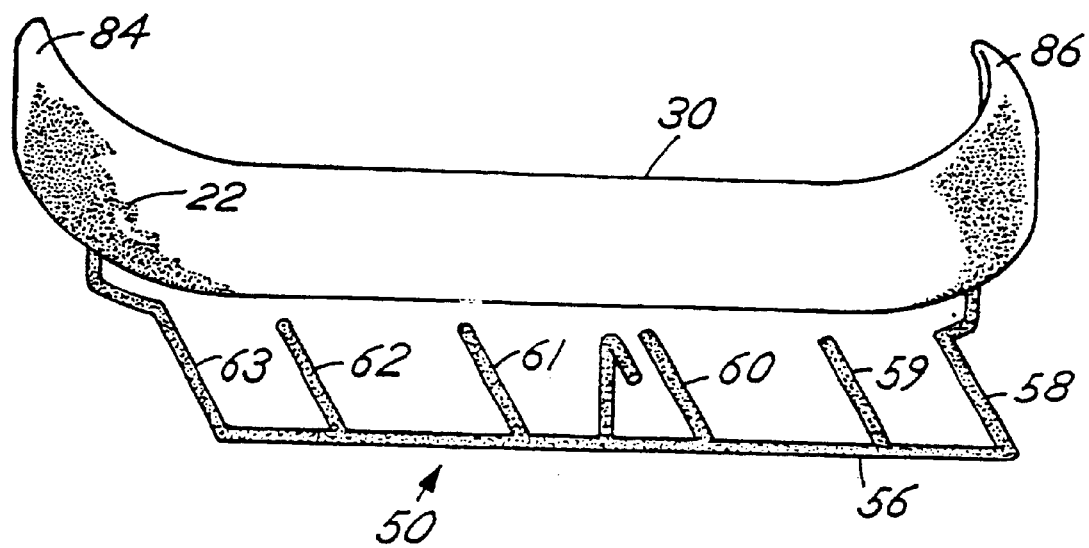
FIGS. 7(a)–(e) illustrate five temporally-spaced schematic illustrations of a mold cavity to show the melt front advancement during a 10-second fill time in an example automobile bumper mold application of the present invention through sequential operation of six valve gates.
Figure 7B:
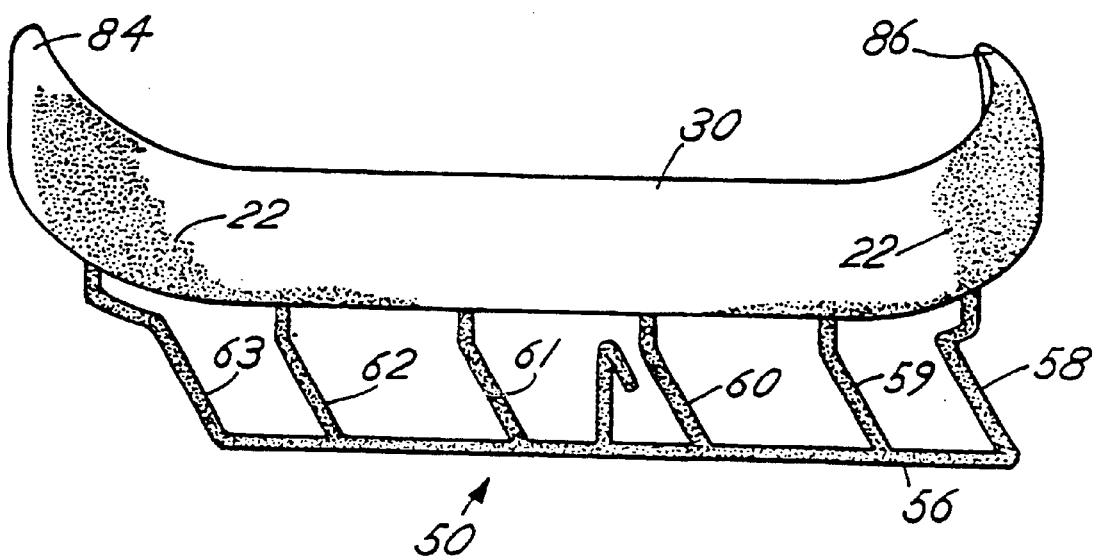
Figure 7C:
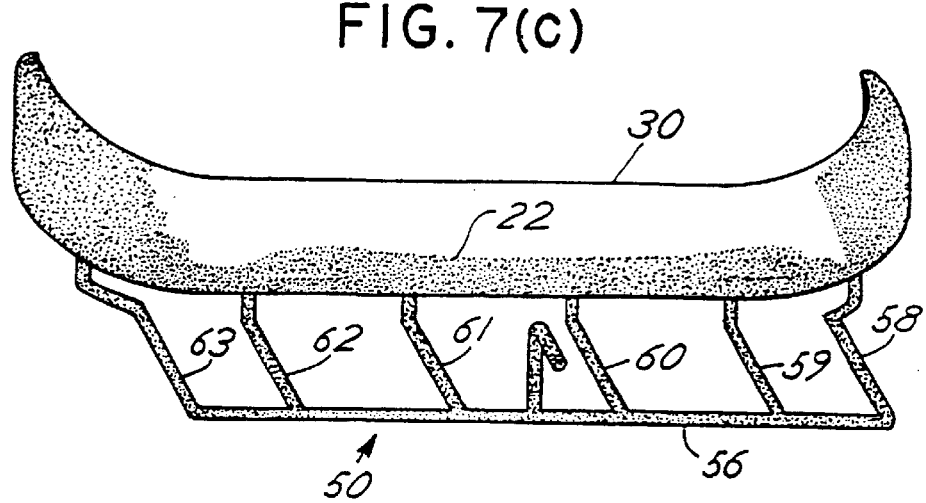
Figure 7D:
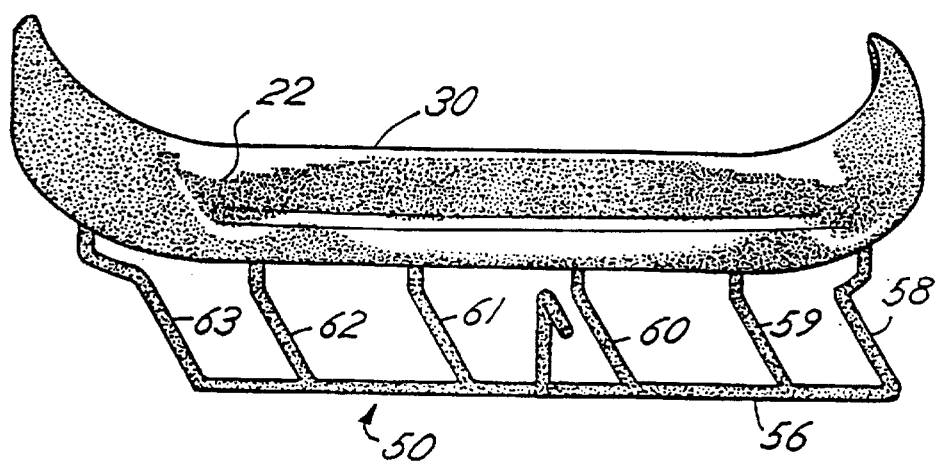
Figure 7E:
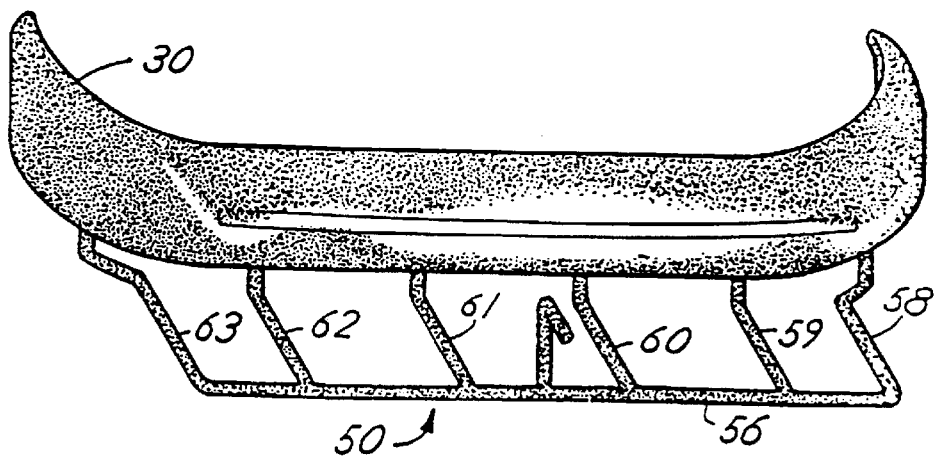

FIG. 6 is a second diagram to illustrate a reduced cycle time achieved through the preferred embodiment of the present invention in one example application. With reference to FIGS. 1, 6, 7(a)–(e), and 8, the mold cavity 30 described herein is a single-cavity automobile facia mold that is used to produce an automobile facia, such as a bumper component for example, formed from a PC/polyester material such as molded-in color PC/Polyester blend, TPO, TPE, or TPU.

With reference now to FIG. 1, plastic pellets 10 are fed from a hopper 12 into a cylindrical channel 14, where the pellets 10 are transported along the length of the channel 14 through the use of a reciprocating screw 16. The pellets 10 melt as they traverse the heated channel 14 and coalesce to form a melt pool 22. The melt pool 22 that resides upstream from the screw 16 constitutes the shot of plasticized material in queue to be next injected through the mold manifold 50 and into the mold cavity 30. Displacement of the reciprocating screw 16 is detected by a positional sensor 52, and the output 53 of the sensor 52 is supplied to a control system 54 for use as later described.

The mold clamp pressure builds to and maintains a full pressure. The mold cavity 30 fills in a sequential manner, as described below, with the melt pool 22 in queue. The primary or first stage injection pressure exerted on the melt pool 22 by the screw 16 creates an injection pressure that causes the melt pool 22 to advance through the main bore 56 of the manifold 50. The primary injection pressure is preferably on the order of 10,000 to 20,000 PSI (or 68.9 to 137.8 Mpa), depending upon the viscosity of the selected material.

The six spaced drops 58–63 that depend from the main bore 56 are outfitted with valve gates 64 that may be independently open and closed through operation of a control system 54, such that the introduction of the melt 22 into the mold cavity 30 through a particular drop may be controlled independent of the other drops. Specifically, the mold is preferably outfitted with a KONA Valve Gate Hot Runner System or equivalent Six manifold drops 58–63 provide for the introduction of the melt 22 into the single mold cavity 30 at six different locations. A Kona SR20VG valve gate 64 or equivalent is located at each of the six manifold drops 58–63.

Each valve gate 64 is actuated by a hydraulic control unit 66. A controller 68, such as the machine controller for the mold press for example, is programmed to provide through lines 70 the desired sequencing and other control over the pin actuation at the individual valve gate locations 64. The preferred controller 68 controls the various valve gates as a function of both cycle time and position of the screw 16. The output of a positional sensor 52 on the screw 16 may be used by the controller 68 as a reference for determining the instantaneous aft and fore position of the screw 16. The controller 68 thereby may direct the valve gates 64 to operate in such a way so as to exhibit greater control over the molding process. In this way the controller 68 may, for example, systematically control the flow fronts of the melt 22 within the mold cavity 30, and may manipulate the valve gates 64 to apply a final packing pressure at the appropriate stage of the mold cycle to compensate for shrinkage of the plasticized material away from the mold wall as the material cools.

As is shown for example in FIGS. 4(a) and 4(b), each of the six valve gates 64 feature an adjustable valve pin 74 that may be independently controlled by an appropriately-programmed control system 54. The valve pin 74 extends centrally along the length of the manifold drop, and can be reciprocated in an axial direction. When the valve pin 74 is retracted within the central channel 76 of the manifold drop, as is shown for example in FIG. 4(a), the melt 22 may pass from the main bore 56 down the central channel 76 of the drop around the valve pin 74, and out an aperture 78 at the end of the drop and into the mold cavity 30. When the valve pin 74 is moved by the control system 54 into position to plug and seal the drop aperture 78, as is shown for example in FIG. 4(b), the melt 22 ceases to flow into the mold cavity 30.

This positive mechanical gate shut off capability provided by the valve pin 74 not only helps reduce or eliminate vestige on part surfaces, but also allows the valve gates 64 of the various drops 58–63 to be sequenced during the injection stage as provided by the present invention. The example mold cavity 30 illustrated in the figures fills sequentially through the six valve gated nozzles on the six manifold drops 58–63, as is shown in FIG. 8. The drops 58–63 are spaced so as to distribute plasticized material across the mold cavity 30 to completely fill the cavity 30 in an efficient manner. The control system 54 operates the valve gates 64 in a predetermined sequential manner to obtain an efficient and balanced fill of the mold cavity 30.

The valve gating sequence used for the automobile fascia described herein is shown for example in FIGS. 7(a)–(e) and 8. Specifically, two gated nozzles 64 located in the outer wing regions 84 and 86 of the mold cavity 30 (drops 58 and 63) are first to open at injection time =0 seconds. The central four gated drops 59–62 remain closed and a primary or first stage injection pressure delivers plasticized material into the wing portions of the mold cavity 30 through the outer two gated drops 58 and 63. At approximately 3.5 seconds into the injection period, the outer two gated drops 58 and 63 are closed and the central four gated drops 59–62 are opened. The primary or first stage injection pressure then delivers plasticized material to the central portion of the mold cavity 30.

The particular sequencing of the six gates 64 in the preferred embodiment described herein was determined empirically. Alternatively, conventional mold fill analyses may be used to determine the appropriate sequencing of the gated nozzles to achieve the desired melt front advancement and fill balancing. It will be readily apparent that the gate sequencing that may be used in a particular application will depend on a variety of factors, including mold cavity shape, number of drops, and type of material used, to name only a few.

Once the part has been substantially filled (e.g. 95% filled) during the first stage pressure of the preferred embodiment, the outer two valve gates (64 of drops 58 and 63) open once again such that plasticized material is delivered to the mold cavity 30 through all six valve gates. The injection pressure is also lowered to a secondary or hold pressure of approximately 50% the primary injection pressure, whereby the mold may continue to fill to capacity and to compensate for shrinkage during cooling, without creating unwanted flash. The hold pressure, however, is still sufficient to avoid appreciable expansion of the melt 22. Once the mold has been completely filled, all six valve gates 64 are closed to seal the manifold from the mold cavity 30.

Because the manifold seal created by the valve pins 74 is much stronger than a seal created by a thermal gate 42 as described above, the positive mechanical gate shut off capability provided by the valve pin arrangement eliminates the need to decompress the melt 22 before, during, or after plastication. Indeed, the positive shut off provided by the valve pin arrangement avoids drool at the nozzle locations 64 without decompression of the melt 22. Therefore, a sufficient compression pressure may be maintained on the melt pool 22 whenever the valve gates 64 are closed, such as during and between part cycles for example, to avoid appreciable expansion of the melt 22. As mentioned above, expanding gasses or other volatiles in the melt 22 upstream of the valve gates 64 during melt decompression has been found to often result in imperfections in subsequently-molded parts. The compression pressure is therefore preferably of a sufficient magnitude to keep such expansion from occurring and thereby forming imperfections, such as splay for example, on the molded part. A compression pressure of at least approximately 75–150 PSI (or 0.5–1.0 Mpa), for example, is preferably used in the system described herein.

Moreover, the positive mechanical gate shut off feature allows the clamp to be opened for part removal while additional material is plasticized as a part of screw recovery, thereby further reducing overall cycle time. The compression pressure is preferably maintained on the melt 22 during such screw recovery.

The total time for the sequential valve gate molding cycle described above is approximately 75 seconds or less, as compared to the 100–110 second or more cycle previously experienced with non-sequential thermal gates. Not only does the reduced cycle time result in a savings in time and energy, as well as an increase in manufacturing capacity, the reduction in cycle time also further enhances the quality of the final molded product. Indeed, decreased residence time of the melt 22 helps to avoid the occurrence of gas bubbles or other volatiles that may cause splay or other imperfections in the final product.

In addition to the reduction in overall cycle time and the occurrence of splay imperfections in the molded product, the preferred sequential fill valve gated system provides control over the melt front advancement during the filling phase. In turn, this provides more control over the final part size and shape by evenly distributing and reducing molded-in stresses. With reference to the formation of an automobile bumper for example, traditionally the center of the bumper mold fills first and becomes overpacked as the wings of the bumper mold fill out. The sequential fill valve gated system described herein permits the wings of the mold to be filled first, so as to avoid overpacking the mold center. This allows a fill pattern to be constructed whereby all the flow fronts within the mold converge simultaneously. As a result, more uniform packing may be achieved over the entire molded product to provide a lower and more uniform stress distribution within the molded product.

Moreover, since the various flow fronts can be controlled to converge more uniformly, knit line appearance can be reduced or eliminated to improve the appearance of the molded product. Knit lines in earlier molded automobile facias, for example, often occurred in the center of the part, and were sometimes visible even after painting.

Empirical analysis of the sequential fill valve gated system described herein determined that the imposition of a delay of approximately three-seconds before injecting into the mold cavity 30 through the center four gates (64 at drops 59–62) both moved and optimized the location of the knit line on the molded product, and reduced the intensity of the knit line such that any read-through after painting could be minimized and often eliminated.

Control of the flow front as described herein may also be used to reduce the occurrence of flash, which results in less trimming of the molded part and prevention of mold damage at the parting line 80. Moreover, instead of customizing the sizes of the various drop channels in the manifold to control the flow front and to balance the fill, the systematic control of the valve gates 64 as provided by the system described herein may be used to provide the necessary flow front control and fill balancing using uniformly-sized interior channels in the manifold 50. Indeed, the interior channels in all six drops 58–63 used in the system described herein are, for example, each one inch in diameter to correspond with a one-inch channel diameter upstream of the drops 58–63 in the manifold 50. There is no longer a need to design and/or otherwise rely upon customized drops, which are often both costly to and time-consuming to ready. Flow front control and fill balancing is instead achieved through appropriate sequencing of the various valve gates 64, as provided by the present invention.

The sequential fill valve gated system described herein also serves to reduce the molded-in and localized stresses. Reduced stresses of this sort result in improved dimensional stability of the molded part. Indeed, the balanced fill can reduce molded-in and localized surface stresses by equally distributing the pressure needed to fill certain regions of the mold, such as the wing regions 84 and 86 of the example bumper component mold 30 shown in the figures. This avoids any need to mold a crown onto the molded part to otherwise compensate for stress and shrinkage effects, or part movement during paint curing at elevated temperatures.

The system of the present invention also serves to improve the paint adhesion characteristics of the molded product, which can be critical in certain molding applications such as automobile facias for example. It is often required that the painted surface be capable of resisting chipping and peeling throughout the life of the molded part. Molded products formed through the use of the system described herein have evidenced improved paint adhesion characteristics, thereby reducing the time and expense necessary to ensure that paint otherwise adheres to the part.

The improved paint adhesion characteristics is attributed to the lower surface stresses on the molded product, and to the more controlled and efficient mold cavity venting capable of being realized with the present invention. Under certain typical processing conditions, the surface structure of the base resin can be altered in such a way that paint adhesion is negatively effected. Specifically, the molded surface, under the influence of high pressures, high temperatures, and entrapped volatiles resulting from an unbalanced fill, becomes more chemically resistant to solvents required for paint preparation. The increased control over the fill pattern as provided by the sequential fill valve gated system described herein reduces molded-in stresses which, in turn, results in improved paint adhesion characteristics of the molded product.

With the ability to control fill patterns and knit line locations, it is also possible to successfully fill more complex mold cavity geometries. This increased molding window gives the design engineer more flexibility with molded parts such as automobile facias for example. Further, as industries such as the automotive industry move toward molded-in color for large exterior and interior applications, the control provided by the sequential fill valve gated system described herein over fill patterns and knit line locations— which are important for molded-in color applications— offers the added processability to meet this challenge. The elimination or reduction of knit lines in molded-in color parts, for example, can be achieved by sequencing the valve pins 74 such that the outboard nozzle opens first and, the next inboard gate opens after the flow front from the outboard nozzle passes the inboard gate location. Material from the inboard nozzle pushes through the flow front and advances to the next adjacent inboard nozzle location. This process continues until the flow front passes the last nozzle location at which the last gate opens to finish filling the mold cavity 30. The result can be the elimination or at least a reduction of knit lines, which can prove to be significant in the success of a molded-in color application.

By utilizing plastic pellets with the loading of nanoparticles discussed above (e.g., less than 15% of a total volume of the pellets), higher modulus of elasticity of conventional large plastic parts can be achieved, and thus be manufactured with a reduced wall thickness while maintaining the same required impact resistance. Control over the melt front advancement during the filling phase also makes it possible to significantly increase the number of nozzles or drops used to fill the mold cavity 30. Additional nozzles may be used in this fashion to reduce the flow length versus wall thickness ratios otherwise required to fill the mold cavity 30, which can in turn lead to thinner wall molding. Control over the filling pattern of the automobile fascia in combination with use of nanoparticle reinforced pellets described herein, for example, may result in a reduction of a typical 3.3 mm fascia wall section by more than 33%. In addition to making thinner walled parts, it is also possible to make larger parts by enlarging the size of mold cavity 30. Larger parts can thus be made while maintaining or reducing the wall thickness of the parts. Control over the melt front also provides for more efficient venting of the mold cavity 30, insofar as air trapped in the cavity 30 can be directed toward and out of the appropriate mold vents in a systematic manner.

In one example, the modulus of the material used to form a fascia is increased to between about 200,000 to about 500,000 PSI (or 1378 to 3446 Mpa). As a result, the fascia can be provided with a (largest dimension/wall thickness) ratio of greater than 1200. In one example, a vehicle fascia having an average wall thickness of less than or equal to 2.2 mm and largest dimension (from wheel well to wheel well) of at least 3000 mm is provided while maintaining the required impact resistant characteristics. In this example, it can be appreciated that the mold cavity 30 has an average distance between the major facing surfaces 31 and 33 of about 2.2 mm and a largest dimension of at least 3000 mm. The accuracy of the average wall thickness measurement is generally within +/−0.2 mm.

In another preferred example, a vehicle hood panel is provided with a (largest dimension/wall thickness) ratio of greater than 750. In one example, the hood panel has a largest dimension of at least 1800 mm and an average wall thickness of less than or equal to 2.5 mm.

In yet another example, a vehicle interior door panel is provided with a (largest dimension/wall thickness) ratio of greater than 500. In one example, the door panel has a largest dimension of at least 750 mm and an average wall thickness of less than or equal to 1.5 mm.

For these last two examples, the size of the mold cavity would be changed accordingly.

The ratio's discussed above are dependent upon the structural integrity/impact resistance/elasticity requirements for the parts in question.

In accordance with the present invention, by adding the exfoliated platelet material in accordance with the above, the modulus of the large, thin part can be increased without significantly losing impact resistance. Because the modulus is increased, large thin parts, such as fascia, can be made thinner than what was otherwise possible. More specifically, fascia materials for automobiles must have sufficient impact resistance or toughness to withstand various standard automotive impact tests. For example, an automotive fascia must withstand a typical dart (puncture type) impact test wherein the fascia will not crack or permanently deform upon impact of at least 200 inch pounds force (or 22.6 Joules) at a temperature of −30° C. or lower. In a conventional IZOD impact test, it is desirable for the fascia to withstand at least 10 ft pounds/inch (or 535 Joules/meter) at room temperature and at least 5 ft pounds/inch (or 267 Joules/meter) at −30° C. In order to withstand cracking at such force levels, the modulus for the conventional fascia is typically between about 70,000 to about 150,000 pounds per square inch (PSI) (or 482 to 1034 Mpa).

In accordance with the present invention, the modulus can be increased by a factor of 2 to 3 times, without significantly effecting the impact resistance.

In addition to the above mentioned benefits, use of the nanoparticle reinforced pellets enables the coefficient of linear thermal expansion to be reduced to less than 40×10−6 inches of expansion per inch of material per degree Fahrenheit (IN/IN)/°F. (or 72×10$^{-6}$ (mm/mm)/°C.), which is less than 60% of what was previously achievable for motor vehicle fascia that meet the required impact tests. As a further benefit, the surface toughness of the fascia can be improved.

The improved surface toughness provided by the nanoparticles greatly reduces handling damage and part scrap. It also eliminates the need for the extra packaging and protective materials and the labor involved.

In addition, it is possible to double the modulus of polymers without significantly reducing toughness. Thus, it is possible to produce parts like fascia using 20–35% thinner wall sections that will have comparable performance. The use of nanoparticles can provide the mechanical, thermal, and dimensional property enhancements, which are typically obtained by adding 20–50% by weight of glass fibers or mineral fillers or combinations thereof to polymers. However, only a few percent of nanoparticles are required to obtain these property enhancements.

As a result of the fact that such low levels of nanoparticles are required to obtain the requisite mechanical properties, many of the typical negative effects of the high loadings of conventional reinforcements and fillers are avoided or significantly reduced. These advantages include: lower specific gravity for a given level of performance, better surface appearance, toughness close to that of the unreinforced base polymer, and reduced anisotropy in the molded parts.

It is preferable for these parts to have reinforcement particles of the type described herein comprising about 2–10% of the total volume of the panel, with the balance comprising the thermoplastic (preferably polyolefin) substrate. It is even more preferable for these exterior panels to have reinforcement particles of the type contemplated herein comprising about 3%–5% of the total volume of the panel.

In accordance with another specific embodiment of the present invention, it is contemplated that the injection molding apparatus can be used to make large, highly reinforced parts having a modulus of elasticity of 1,000,000 PSI (or 6892 Mpa) or greater. Conventionally, these parts typically require loadings of 25–40% by volume of glass fiber reinforcement. This amount of glass fiber loading would result in a high viscosity of any melt pool that could be used in the injection molding apparatus of the present invention and would thus render the injection molding apparatus disclosed herein largely impractical for such application.

Use of the plastic pellets 10 enables the injection molding apparatus disclosed herein to manufacture large parts that can be provided with impact resistance characteristics that were not previously attainable. For example, the injection molding system of the present invention is able to manufacture large parts having a modulus of elasticity of greater than 1,000,000 PSI (or 6892 Mpa) by use of the plastic pellets reinforced with loadings of 8–15% by volume of nanoparticles, with at least 70% of the nanoparticles have a thickness of 10 nanometers or less. As with the above described embodiment, the pellets used has substantially the same material composition as the part to be manufactured. Specifically, the pellets have a modulus of elasticity of greater than 1,000,000 PSI (or 6892 Mpa) and have loadings of 8–15% by volume of nanoparticles, with at least 70% of the nanoparticles having a thickness of 10 nanometers or less.

In this case of molding large parts with a modulus of elasticity greater than 1,000,000 PSI (or 6892 Mpa), it may be desirable to use engineering resins instead of polyolefins. Such engineering resins may include polycarbonate (PC), acrylonitrile butadiene styrene (ABS), a PC/ABS blend, polyethylene terephthalates (PET), polybutylene terephthalates (PBT), polyphenylene oxide (PPO), or the like. Generally, these materials in an unreinforced state has a modulus of elasticity of about 300,000 PSI–350,000 PSI (or 2068–2412 Mpa). At these higher loadings of nanoparticles (8–15% by volume), impact resistance will be decreased, but to a much lower extent than the addition of the conventional 25–40% by volume of glass fibers.

Although certain embodiments of the invention have been described and illustrated herein, it will be readily apparent to those of ordinary skill in the art that a number of modifications and substitutions can be made to the sequential fill valve gated injection molding system disclosed and described herein without departing from the true spirit and scope of the invention.

What is claimed is:

1. A method for molding large components, comprising the steps of:
    providing reinforced plastic pellets comprising at least one thermoplastic material and reinforcement particles dispersed within the at least one thermoplastic material, the reinforcement particles comprising less than 15% of a total volume of the pellets and at least 40% of the reinforcement particles having a thickness of less than about 50 nanometers, said pellets having a modulus of elasticity greater than 6892 MPa, said reinforcement particles comprising 8–15% by volume of said total volume of said pellets, and at least 70% of said reinforcement particles having a thickness of 10 nanometers or less;
    melting the reinforced plastic pellets to produce plasticized material therefrom;
    communicating said plasticized material through a manifold to a cavity mold, said manifold having at least two spaced valve gates that are independently opened and closed as directed by a controller to selectively communicate said plasticized material through said manifold to said mold cavity at separate locations in the mold;
    applying a primary injection pressure to said plasticized material in said manifold to fill said mold cavity through sequential opening and closing of said valve gates as directed by said controller;
    applying a secondary injection pressure to said plasticized material in said manifold to continue to fill said mold cavity, said secondary injection pressure being less than said primary injection pressure;
    closing said valve gates to seal said manifold from said mold cavity when said mold cavity is filled; and
    holding said plasticized material within said manifold in compression while said mold cavity is open for removal of said molded component from said mold cavity, said compression being maintained with the assistance of said closed valve gates to prevent appreciable expansion of said material.

2. A method for molding large components as set forth in claim 1, further comprising the step of:
    plasticizing additional material while said mold cavity is open for removal of said molded component from said mold cavity, said additional plasticized material being held for anticipated communication through said manifold into said mold cavity during a subsequent molding cycle, and said additional plasticized material being held in compression with the assistance of said closed valve gates to prevent appreciable expansion of said material.

3. A method for molding large components as set forth in claim 1, wherein said controller directs all of said valve gates to open for simultaneous transfer of plasticized material through said valve gates into said mold cavity while said secondary injection pressure is applied to said plasticized material in said manifold.

4. A method for molding large components as set forth in claim 3, wherein said secondary injection pressure is applied with the aid of a screw from an injection molding machine, and wherein occurrence of said direction from said controller to all of said valve gates to open for simultaneous transfer of plasticized material through said valve gates is a function of both molding cycle time and position of said screw.

5. A method according to claim 1, wherein said reinforcement particles are formed by exfoliating larger mineral particles into constituent layers so that said at least 40% of the reinforcement particles have said thickness of less than about 50 nanometers.

6. A method according to claim 1, wherein at least 50% of the reinforcement particles have a thickness of less than 10 nanometers.

7. A method according to claim 6, wherein at least 70% of the particles have a thickness of less than 5 nanometers.

8. A method according to claim 1, wherein said thermoplastic comprises at least one polyolefin material.

9. A method according to claim 1, wherein said thermoplastic comprises at least one enginerring resin material.

10. A method according to claim 1, wherein at least 50% of the reinforcement particles have a thickness of less than about 20 nanometers, at least 90% of the reinforcement particles have a thickness of less than about 10 nanometers, and at least 99% of the reinforcement particles have a thickness of less than about 30 nanometers.

11. A method according to claim 1, wherein said mold cavity is defined between two major facing surfaces, and wherein an average distance between said major facing surfaces is about 2.2 mm+/−0.2 mm, and wherein said mold cavity has a largest dimension of at least 3000 mm, such that said molded component has an average wall thickness of about 2.2 mm+/−0.2 mm and has a largest dimension of at least 3000 mm.

12. A method according to claim 1, wherein said mold cavity is defined between two major facing surfaces, and wherein an average distance between said major facing surfaces is about 1.5 mm+/−0.2 mm, and wherein said mold cavity has a largest dimension of at least 750 mm, such that said molded component has an average wall thickness of about 1.5 mm+/−0.2 mm and has a largest dimension of at least 750 mm.

13. A method according to claim 1, wherein said mold cavity is defined between two major facing surfaces, and wherein an average distance between said major facing surfaces is about 2.5 mm+/−0.2 mm, and wherein said mold cavity has a largest dimension of at least 1800 mm, such that said molded component has an average wall thickness of about 2.5 mm+/−0.2 mm and has a largest dimension of at least 1800 mm.

14. A method for molding large components, comprising the steps of:
    providing reinforced plastic pellets comprising at least one thermoplastic material and reinforcement particles dispersed within the at least one thermoplastic material, the reinforcement particles comprising less than 15% of a total volume of the pellets, and at least 40% of the reinforcement particles having a thickness of less than about 50 nanometers, said pellets have a modulus of elasticity greater than 6892 MPa, said reinforcement particles comprising 8–15% by volume of a total volume of said pellets, and at least 70% of said reinforcement particles having a thickness of 10 nanometers or less;

melting the reinforced plastic pellets to produce plasticized material therefrom;

using a manifold for communicating said plasticized material to a cavity mold, said manifold having at least two spaced valve gates that are independently opened and closed as directed by a controller to selectively communicate said plasticized material from said manifold to said mold cavity at separate locations in the mold;

applying a primary injection pressure to said plasticized material in said manifold to fill said mold cavity through sequential opening and closing of said valve gates as directed by said controller;

applying a secondary injection pressure to said plasticized material in said manifold to continue to fill said mold cavity, said secondary injection pressure being less than said primary injection pressure;

closing said valve gates to seal said manifold from said mold cavity when said mold cavity is filled; and holding said plasticized material within said manifold in compression while said mold cavity is open for removal of said molded component from said mold cavity, said compression being maintained with the assistance of said closed valve gates to prevent appreciable expansion of said material.

15. A method for molding large components as set forth in claim 14, further comprising the step of:

plasticizing additional material while said mold cavity is open for removal of said molded component from said mold cavity, said additional plasticized material being held for anticipated communication through said manifold into said mold cavity during a subsequent molding cycle, and said additional plasticized material being held in compression with the assistance of said closed valve gates to prevent appreciable expansion of said material.

16. A method for molding large components as set forth in claim 14, wherein said controller directs all of said valve gates to open for simultaneous transfer of plasticized material through said valve gates into said mold cavity while said secondary injection pressure is applied to said plasticized material in said manifold.

17. A method for molding large components as set forth in claim 16, wherein said secondary injection pressure is applied with the aid of a screw from an injection molding machine, and wherein occurrence of said direction from said controller to all of said valve gates to open for simultaneous transfer of plasticized material through said valve gates is a function of both molding cycle time and position of said screw.

18. A method according to claim 14, wherein said reinforcement particles are formed by exfoliating larger mineral particles into constituent layers so that said at least 40% of the reinforcement particles have said thickness of less than about 50 nanometers.

19. A method according to claim 14, wherein at least 50% of the reinforcement particles have a thickness of less than 10 nanometers.

20. A method according to claim 19, wherein at least 70% of the particles have a thickness of less than 5 nanometers.

21. A method according to claim 14, wherein said thermoplastic comprises at least one polyolefin material.

22. A method according to claim 14, wherein said thermoplastic comprises at least one engineering resin material.

23. A method according to claim 14, wherein at least 50% of the reinforcement particles have a thickness of less than about 20 nanometers, at least 90% of the reinforcement particles have a thickness of less than about 10 nanometers, and at least 99% of the reinforcement particles have a thickness of less than about 30 nanometers.

24. A method according to claim 14, wherein said mold cavity is defined between two major facing surfaces, and wherein an average distance between said major facing surfaces is about 2.2 mm+/−0.2 mm, and wherein said mold cavity has a largest dimension of at least 3000 mm, such that said molded component has an average wall thickness of about 2.2 mm+/−0.2 mm and has a largest dimension of at least 3000 mm.

25. A method according to claim 14, wherein said mold cavity is defined between two major facing surfaces, and wherein an average distance between said major facing surfaces is about 1.5 mm+/−0.2 mm, and wherein said mold cavity has a largest dimension of at least 750 mm, such that said molded component has an average wall thickness of about 1.5 mm+/−0.2 mm and has a largest dimension of at least 750 mm.

26. A method according to claim 14, wherein said mold cavity is defined between two major facing surfaces, and wherein an average distance between said major facing surfaces is about 2.5 mm+/−0.2 mm, and wherein said mold cavity has a largest dimension of at least 1800 mm, such that said molded component has an average wall thickness of about 2.5 mm+/−0.2 mm and has a largest dimension of at least 1800 mm.

\* \* \* \* \*

UNITED STATES PATENT AND TRADEMARK OFFICE
CERTIFICATE OF CORRECTION

PATENT NO.     : 6,558,605 B1                                              Page 1 of 1
DATED          : May 6, 2003
INVENTOR(S)    : Wilson It is certified that error appears in the above-identified patent and that said Letters Patent is hereby corrected as shown below:

<u>Column 1,</u>
Line 4, please add the following immediately following the Title of the Invention:

-- Governmental Support and Interest:
   The invention in this patent was made with Governmental support under Cooperative Agreement No. 70NANB7H3028 awarded to the Dow Chemical Company and Decoma International of America, Inc. (formerly Magna International of America, Inc.), Project ID 1997-02-0047B, Project name "NANOCOMPOSITIES – NEW LOW COST/HIGH STRENGTH MATERIALS FOR AUTOMOTIVE PARTS," awarded September 30, 1997 by the United States Department of Commerce, National Institute of Standards and Technology, Advanced Technology Program. The Government has certain rights in this invention. --

Signed and Sealed this

Twenty-third Day of September, 2003

JAMES E. ROGAN
*Director of the United States Patent and Trademark Office*